(12) United States Patent
Staudenmaier et al.

(10) Patent No.: US 10,026,151 B2
(45) Date of Patent: Jul. 17, 2018

(54) HEAD-UP DISPLAY WARPING CONTROLLER

(71) Applicants: Michael Andreas Staudenmaier, Munich (DE); Kshitij Bajaj, Sirsa (IN); Chanpreet Singh, SAS Nagar (IN)

(72) Inventors: Michael Andreas Staudenmaier, Munich (DE); Kshitij Bajaj, Sirsa (IN); Chanpreet Singh, SAS Nagar (IN)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/024,774

(22) PCT Filed: Sep. 27, 2013

(86) PCT No.: PCT/IB2013/058929
§ 371 (c)(1),
(2) Date: Mar. 24, 2016

(87) PCT Pub. No.: WO2015/044716
PCT Pub. Date: Apr. 2, 2015

(65) Prior Publication Data
US 2016/0247255 A1    Aug. 25, 2016

(51) Int. Cl.
*G06T 3/00* (2006.01)
*G02B 27/00* (2006.01)
*G02B 27/01* (2006.01)

(52) U.S. Cl.
CPC ........ *G06T 3/0093* (2013.01); *G02B 27/0025* (2013.01); *G02B 27/0101* (2013.01);
(Continued)

(58) Field of Classification Search
CPC ... G06T 3/0093; G06T 3/005; G02B 27/0101; G02B 27/0025; G02B 2027/013; G02B 2027/014; G02B 2027/011; G02B 27/01
See application file for complete search history.

(56) References Cited

U.S. PATENT DOCUMENTS 6,272,431 B1 * 8/2001 Zamojdo ............... G01C 21/36
                                                 348/115
8,766,998 B1 * 7/2014 Morgan, III ......... H04N 9/3194
                                                 345/419
(Continued)

FOREIGN PATENT DOCUMENTS

JP    2004098834 A  *  4/2004
JP    2004226469 A  *  8/2004
(Continued)

OTHER PUBLICATIONS

Motten et al., "Adaptive memory architecture for real-time image warping", IEEE 2012, pp. 466-471.
(Continued)

*Primary Examiner* — Jose Soto Lopez

(57) ABSTRACT

A script-driven head-up display controller comprising an image warping unit and an image projection unit wherein the image warping unit is coupled to the image projection unit and is adapted to:
  receive a line-based warping descriptor comprising first information associated with a distortion caused by a non-flat display; and,
  in response to the reception of the line-based warping descriptor, the image warping unit is further adapted to, based on the line-based warping descriptor:
    fetch one or more lines of the source image; and,
    output to the image projection unit at least one output line of the output image associated with an electronic image warping of one or more pixels of the one or more input lines,
and wherein the line-based warping descriptor further comprises second information associated with buffer management instructions calculated off-line.

17 Claims, 3 Drawing Sheets

(52) U.S. Cl.
CPC .............. *G06T 3/005* (2013.01); *G02B 27/01* (2013.01); *G02B 2027/011* (2013.01); *G02B 2027/013* (2013.01); *G02B 2027/014* (2013.01)

(56) References Cited

U.S. PATENT DOCUMENTS

| | | | | |
|---|---|---|---|---|
| 2003/0058368 A1* | 3/2003 | Champion | ................ | G06T 1/60 348/581 |
| 2003/0215230 A1* | 11/2003 | Gallagher | ............. | G06T 3/0018 396/311 |
| 2006/0267925 A1* | 11/2006 | Sakamaki | ............. | G06F 3/1423 345/104 |
| 2007/0159317 A1* | 7/2007 | Nagata | ..................... | B60R 1/00 340/461 |
| 2007/0291051 A1* | 12/2007 | Brown | ............... | G02B 26/0816 345/647 |
| 2008/0088526 A1* | 4/2008 | Kadantseva | ........... | G02B 27/01 345/1.1 |
| 2008/0088527 A1* | 4/2008 | Fujimori | ................ | G02B 27/01 345/7 |
| 2008/0088528 A1* | 4/2008 | Shindo | ................... | G02B 27/01 345/7 |
| 2008/0101711 A1* | 5/2008 | Kalker | ...................... | G06T 3/00 382/254 |
| 2008/0297868 A1* | 12/2008 | Mizumoto | ......... | G02B 26/0858 359/199.1 |
| 2010/0253489 A1* | 10/2010 | Cui | ....................... | G01S 13/723 340/425.5 |
| 2011/0227937 A1* | 9/2011 | Todorovich | ............. | G06F 3/147 345/545 |
| 2012/0224062 A1* | 9/2012 | Lacoste | ................ | G01C 21/365 348/148 |
| 2013/0083298 A1* | 4/2013 | Yoshimura | ........... | G03B 21/006 353/69 |
| 2014/0002503 A1* | 1/2014 | Saigo | ..................... | G06T 5/008 345/647 |

FOREIGN PATENT DOCUMENTS

| | | |
|---|---|---|
| JP | 2006091104 A1 | 4/2006 |
| JP | 200810518 A | 5/2008 |

OTHER PUBLICATIONS

Wolberg, George, "Digital Image Warping", IEEE Computer Society Press, 1988 (extract—electronic file not available).
Internation Search Report for the International application No. PCT/IB2013/058929 dated Jun. 16, 2014.

* cited by examiner

HEAD-UP DISPLAY WARPING CONTROLLER

FIELD OF THE INVENTION

This invention relates to an apparatus, a system, a method and a program product of operating a head-up display controller.

BACKGROUND OF THE INVENTION

In environments such as those comprising in-vehicle routing or navigational systems, head-up displays (HUD) compared to head-down displays (HDD), have been found to result in decrease of the amount of time where driver's attention is diverted from the road. Indeed, HUD are usually placed at a location such that the driver does not need to tilt his or her head down in order to look at the display as it is the case with HDD. From a technical point of view, a HUD is a projector configured to project an input image onto a display surface such as a windshield of a car which then reflects the input image into the driver's line of sight. However, the input image projected to the surface is distorted because the display surface is not flat such that the driver sees a distorted version of the input image if specific precautions are not taken. In order to show an image with no distortion, it is needed to correct the curvature of the display surface using a so-called process of image warping. Indeed, image warping is commonly used to compensate for geometric and optical distortions thanks to the application of geometric transformations to an image that redefines the spatial relationship between points in the image. It is to be noted that such process of image warping can be done optically or electronically. A detailed description of the process of image warping can be found in the following document: George Wolberg, "Digital Image Warping", IEEE Computer Society Press, 1988.

Common implementations of electronic image warping make use of memories external to the module performing the warping process. These external memories are used to temporarily store either or both the whole input image and the whole output image (i.e., the distorted version of the input image). Obviously, such implementations may have a huge impact on latency and cost of such warping modules since large memories are needed to store the full input image and/or the full output image. Thus as a solution, some documents suggest to implement the complete warping module on-chip without the use of off-chip memories by solely using the input line-buffer of the warping module which is configured to receive lines of pixels coming from the input image. Namely, instead of using a single line-buffer with a fixed length, it is proposed in such document to use one out of several line-buffer-based data structures within which each line-buffer is adapted in length to specific homogeneous section of the input image. The details of the foregoing implementation can be found in the following document: Andy Motten, Luc Claesen, Yun Pan, "Adaptive memory architecture for real-time image warping", ICCD 2012, pages 466-471.

Notably, this document considers solely implementing the warping process into hardware in order to achieve low latency and reduce cost. However, this document is silent about how to dynamically determine the requirements for buffer management for each line-buffer so as to deliver the resulting output pixels on time to the display surface.

SUMMARY OF THE INVENTION

The present invention provides an apparatus, a system, a method and a program product of operating a head-up display controller as described in the accompanying claims. Specific embodiments of the invention are set forth in the dependent claims. These and other aspects of the invention will be apparent from an elucidated with reference to the embodiments described hereinafter.

BRIEF DESCRIPTION OF THE DRAWINGS

Further details, aspects and embodiments of the proposed solution will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
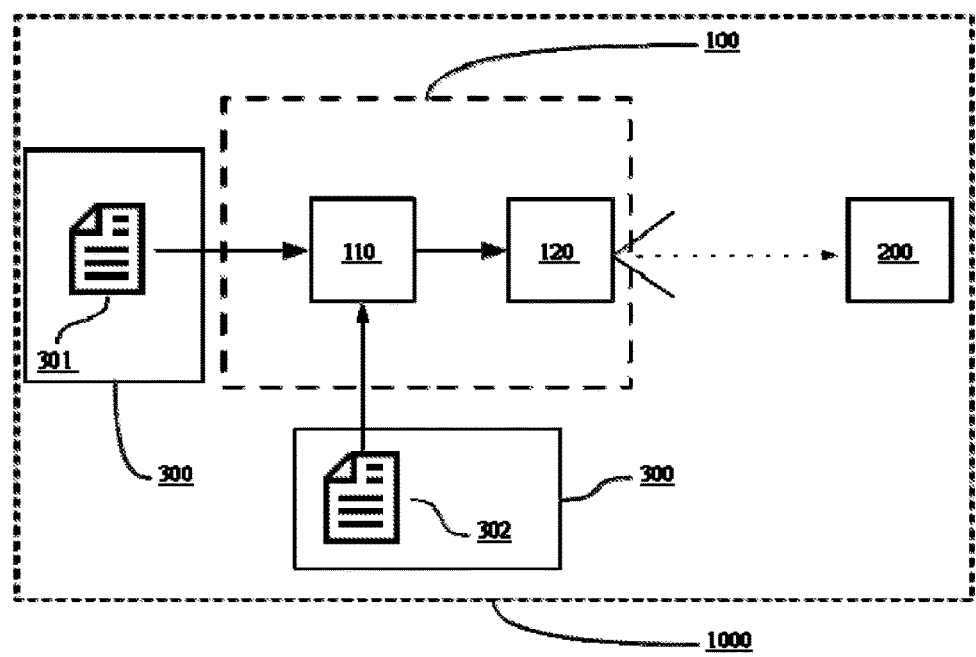
FIG. 1 is a schematic diagram of a head-up display system according to an embodiment of the subject application.

Because the illustrated embodiments of the proposed solution may for the most part, be composed of electronic components and circuits known to those skilled in the art, details will not be explained in any greater extent than that considered necessary for the understanding and appreciation of the underlying concepts of the subject application, in order not to obfuscate or distract from the teachings of the subject application.

However, for the sake of clarity and for a proper understanding of the subject application, the following detailed description will be considered in the automotive field wherein HUD are commonly used to provide visual information to a driver such as vehicle speed, warnings, gas level, gears position, radio setting and position navigation. However, persons skilled in the art of safety systems will understand that the proposed solution may also be implemented in other domains having similar objectives such as in the aviation or military fields.

Image warping can be easily understood if one contemplates, as an example, an image printed on a sheet of rubber. In fact, image warping has the same effect on an image as does stretching or pinching the rubber sheet at interesting places. Such desired distortion of an image may be modelled by a warping transformation function Warp( ). In other words, and relative to the automotive field, a warping transformation function Warp( ) mathematically describes the way an input image is distorted by the windshield of a car while being projected by a HUD. Namely, a warping transformation function Warp( ) is usually a non-linear function which consists of a set of parameters defining the correspondence between an input pixel in an input image $image_{input}$ given to the HUD and an output pixel of an output image $image_{output}$ observed in the line of sight of the driver. Practically, if an input image $image_{input}$ is projected by the HUD onto the windshield then the driver will observe the output image $image_{output}=\mathrm{Warp}(image_{input})$ which corresponds to the input image $image_{input}$ being distorted by the warping transformation function Warp( ). Therefore, if one wants the driver to see the input image $image_{input}$ on the windscreen in an undistorted form, it is need instead to have the HUD project Warp$^{-1}$(image$_{input}$) which is a pre-distorted version of the input image image$_{input}$ which basically corresponds to the input image image$_{input}$ being distorted by an inverse warping transformation function Warp$^{-1}$( ) of the warping transformation function Warp( ). This way, the driver will observe in his or her field of vision, the output image image$_{output}$=Warp(Warp$^{-1}$(image$_{input}$))=image$_{input}$ which corresponds to the pre-distorted version of the input image image$_{input}$ being distorted by the warping transformation function Warp( ). It is to be noted that warping can be performed in two ways:

forwardly, by looping over all pixels in the input image image$_{input}$ and projecting them into the output image image$_{output}$ based on the warping transformation function Warp( ), or
 backwardly, by sampling for each output pixel the corresponding pixels in the input images image$_{output}$.

In the following description for the sake of simplicity, only backward image warping will be considered. However, persons skilled in the art of digital image processing will understand that the proposed solution may also be implemented using forward image warping.

Referring to FIG. 1, there is diagrammatically shown therein an exemplary head-up display (HUD) system 1000 according to an embodiment of the subject application. The communication system 1000 as shown comprises:

a script-driven HUD controller 100.
 a non-flat display unit 200; and,
 a storing unit 300 such as a read only memory (ROM) or random access memory (RAM).

In the example of FIG. 1, the storing unit 300 is adapted to store at least one source image 301 and a line-based warping descriptor 302.

In examples of embodiments, the storing unit 300 may be implemented as a first memory adapted to store the source image 301 and a second memory adapted to store the line-based warping descriptor 302, for instance. For example, the source image 301 may be a digital image of a given format representing the speed of the vehicle, warnings, gas level, gears position, radio setting and position navigation. Also, the line-based warping descriptor 302 may be a binary file, a text file, or a combination thereof.

Referring to the example of FIG. 1 as shown, the storing unit 300 is operably coupled to the script-driven HUD controller 100. Further in FIG. 1, the non-flat display unit 200 is adapted to reflect a projected image into the line of sight of a driver of a car. Therefore, for instance, the non-flat display unit may be the windshield of the car. However, other non-flat display units having different form factor (i.e., shape, size, curvature and structure) may be contemplated, for instance.

Referring back to FIG. 1, the script-driven HUD controller 100 as shown comprises:

an image warping unit 110, and
 an image projection unit 120 such as a projector.

In examples of embodiments, the image warping unit 110 and the image projection unit 120 may be implemented as hardware, software or any combination thereof, for instance. In the example of FIG. 1, the image projection unit 120 is adapted to project lines of an output image, referred to as output lines, onto the non-flat display unit 200. It is to be noted that for digital images such as the source image 301 and the output image, a line of the image is made of pixels. Therefore, thereafter, references to lines of an image should be understood to correspond to lines made of pixels. Further in FIG. 1, the image warping unit 110 is adapted to generate at least one output line where the output image corresponds to the result of an electronic image warping of the source image 301. For example, the electronic image warping process, as already described above, may be performed by the image warping unit 110. In the example of FIG. 1, the image warping unit 110 is operably coupled to the image projection unit 120 and is adapted to receive the line-based warping descriptor 302. The line-based warping descriptor 302 comprises a first information associated with a distortion of a test pattern image caused by the non-flat display unit 200 while the test pattern image is projected by the image projection unit 120 onto the non-flat display unit 200 without prior application of an electronic image warping process to the test pattern image. Namely, as already explained above, the first information mathematically describes the distortion of a projected image due to the non-flat display unit 200. For example, the first information may be associated with the above-mentioned warping transformation function Warp( ). Later in FIG. 1, in response to the reception of the line-based warping descriptor 302, the image warping unit 110 is further adapted to, based on the line-based warping descriptor 302, fetch one or more lines of the source image 301, thereinafter referred to as input lines. The image warping unit 110 is also further adapted to generate at least one output line of the output image, the at least one output line being associated with an electronic image warping of one or more pixels of the one or more input lines. Finally, the image warping unit 110 is further adapted to output the at least one output line to the image projection unit 120 for projection onto the non-flat display unit.

Figure 2:
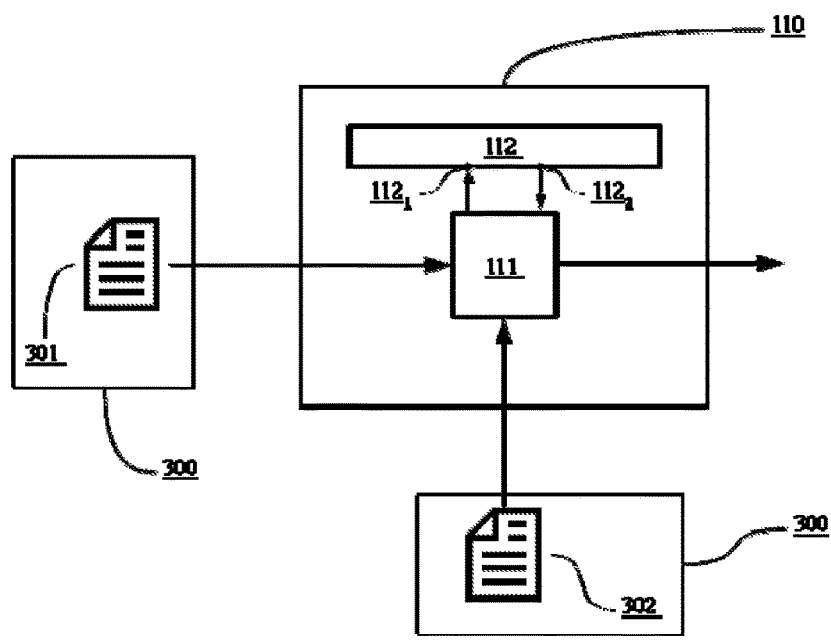
FIG. 2 is a schematic block diagram of an apparatus in accordance with the subject application.

Referring now to FIG. 2, there is diagrammatically shown therein an exemplary image warping unit 110 and the storing unit 300. The image warping unit 110 as shown comprises a processing unit 111 and a line-buffer-based memory 112.

In one embodiment, the line-buffer-based memory 112 may be a dual port circular line-buffer-based memory comprising independent first input port 112$_1$ and second output port 112$_2$, respectively adapted to simultaneously store input lines and output one or more pixels of one or more stored input lines. In another embodiment, the line-buffer-based memory 112 may comprise at least one memory instance adapted to store input lines or output one or more pixels of one or more stored input lines according to a time-multiplexed scheme. Namely, in this embodiment it is not possible to store input lines and output stored input lines at the same time for a given memory instance of line-buffer-based memory 112.

In the example of FIG. 2 as shown, the line-buffer-based memory 112 is adapted to store the one or more input lines of the source image 301. In fact, in order to generate one output line, an electronic image warping process usually requires one or more inputs lines since the distortion due to the non-flat display 200 for a given output pixel may originate from several input pixels coming from one or more different input lines. This is due to the fact that an input image is usually distorted vertically and horizontally while being projected on the non-flat display 200. The foregoing clearly explain why it is rather challenging while generating an output line, to dynamically control for a given line-buffer-based memory 112 which stored input lines should no longer be considered necessary and which new input lines should be fetched from the source images in order to replace the unnecessary ones in the line-buffer-based memory 112. In fact, in examples of embodiments, the line-buffer-based memory 112 may be physically limited in terms of the maximum number of fetched input lines to be stored at once versus the image warping unit 110 outputting one output line. In an example, the line-buffer-based memory 112 may have a limited size of ten lines and be allowed to store two fetched input lines while the image warping unit 110 outputs one output line.

Figure 3A:
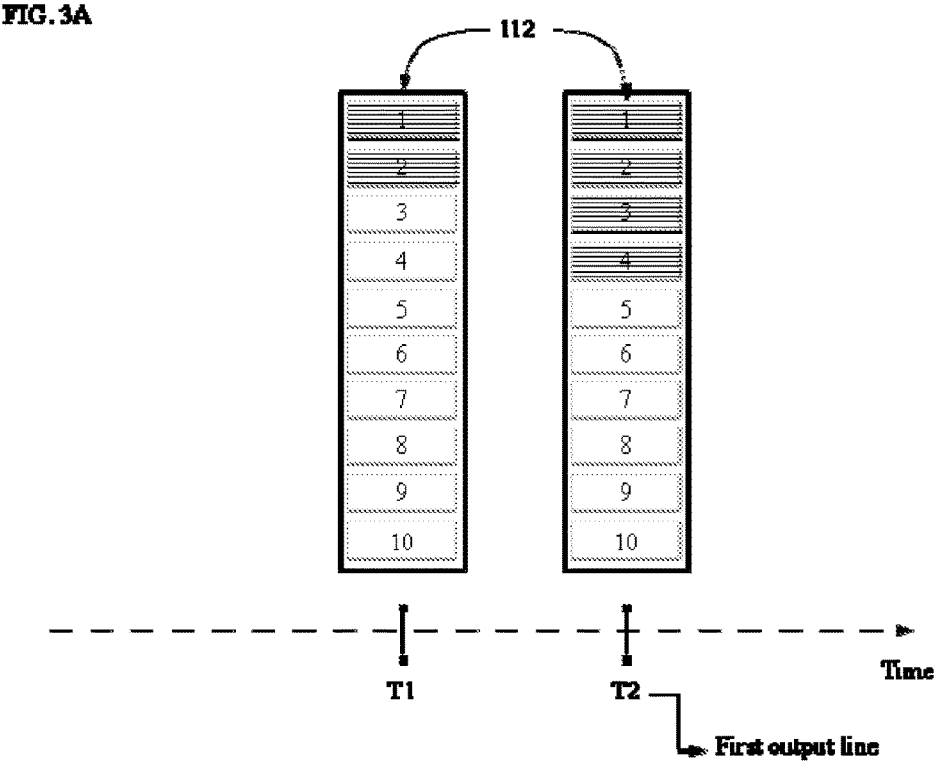
FIGS. 3A-3B are schematic block diagrams of line-buffer-based memory in accordance with the subject application.

In the example of FIG. 3A, it is shown the content of such line-buffer-based memory 112 at different moment in time. At each moment in time T1, T2, the image warping unit 110 is configured to:

fetch two input lines of the source image 301 and store them into the line-buffer-based memory 112; and, output one output line associated with an electronic image warping of one or more pixels of the one or more input lines stored in the line-buffer-based memory 112.

The frequency of occurrence of each moment in time T1, T2 is usually driven by the need to deliver the output lines on time to the non-flat display for a proper output rendering. Therefore, such frequency requirement is rather fixed and cannot be changed easily. Referring back to FIG. 3A, it is considered, as an example, that:

at T1, it is required to output the first output line of the output image based on two input lines during the image warping process; and, at T2, it is required to output the second output line of the output image based on five input lines during the image warping process.

Figure 3B:
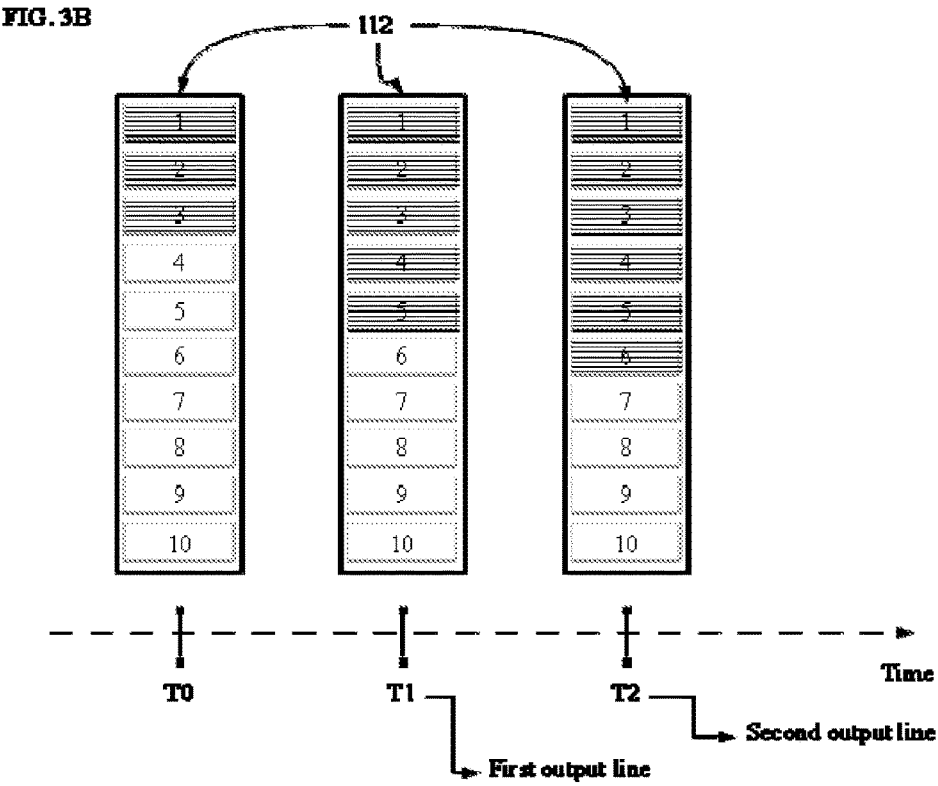

Thus at T1, in operation, the image warping unit 110 fetches two input lines (i.e., lines 1 and 2) of the source image and stores them into the line-buffer-based memory 112. In the example of FIG. 3A, it is to be noted that the stored input lines are represented as hashed lines. In T1, there is no fetching issue since it is allowed to fetch up to two input lines and it has been fetched two input lines. However, no output line is generated since fetching and outputting are to be performed in parallel and the two required input lines for generating the first output line were not present on time. Then, at T2, it is fetched two additional input lines (i.e., lines 3 and 4) and the first output line is generated. Therefore, with such buffer management that can be done on-the-fly, it is not possible to generate the second output line at T2. Consequently, it will be required to wait at a further moment in time (e.g., at T4 which is not shown) in order to be able to output the second output line, since five input lines are needed. This situation is problematic since this could result in a loss of synchronisation with the display unit 200. In the example of FIG. 3B, it is shown one solution which consists in pre-fetching the missing input lines during a moment in time T0 which is located at a prior moment in time relative to T1. For instance, T0 may correspond to a moment in time wherein image warping unit 110 is prevented from doing anything visible to the non-flat display until after a new output image is started to be displayed (e.g., vertical sync). Referring to the example of FIG. 3B, at T0, in operation, the image warping unit 110 fetches three input lines (i.e., lines 1, 2 and 3) of the source image and stores them into the line-buffer-based memory 112. However, at T0, no output line is generated by the image warping unit 110 since nothing is to be displayed onto the non-flat display unit 200 during this moment. Further, at T1, it is fetched two additional input lines (i.e., lines 4 and 5) and the first output line may be generated. Finally, at T2, one additional input lines is fetched (i.e., lines 6) and the second output line may be outputted since at T1 we already fetched the missing two lines to have the required five input lines in the line-buffer-based memory 112. Therefore, with such proposed buffer management that can be determine off-line, it is possible to generate the first and second output lines on time.

To summarise, the foregoing problem may be solved by knowing in advance the content of the line-buffer-based memory 112 at any moment in time such that pre-fetching may be performed in advance in order to anticipate any shortage of stored input lines necessary to generate output lines. However, performing such buffer management on-the-fly in the hardware is quite tricky and may result in a loss of synchronisation with the non-flat display unit 200 which could be catastrophic. For instance, in the automotive field this would mean that critical information such as vehicle speed, or position navigation may not be displayed to the driver anymore thus probably leading to a loss attention of the driver. This is why it is proposed to determine the buffer management off-line using a computer such as a personal computer, for instance, where time management is not a strict constraint. In fact, for a given distortion due to the non-flat display 200, buffer management is rather static and therefore it can be pre-calculated off-line as proposed in the subject application.

Referring back to FIG. 2, the line-based warping descriptor 302 further comprises a second information associated with buffer management instructions which are calculated off-line based on at least:

the first information mathematically describing the distortion due to the non-flat display unit 200; and, one physical characteristic of the line-buffer-based memory 112.

For instance, as explained above regarding the example of FIGS. 3A-3B, the line-buffer-based memory 112 may be physically limited in terms of the maximum number of fetched input lines to be stored at once versus the image warping unit 110 outputting one output line. Also, there may be situation where the storing unit 300 may be shared by other components of the HUD system 1000 or other components of a system comprising the HUD system 1000 such as a graphic processing unit (GPU) or a common processing resources (e.g., a CPU). It is reminded that the source image 301 and the line-based warping descriptor 302 are stored on the storing unit 300. Therefore, if the storing unit 300 is shared, this means that the processing unit 111 may not necessarily access them when needed. Let's say, for instance, that the GPU needs at least 30% of the bandwidth to the storing unit 300 or 100% of the bandwidth during a first period of time and 50% of the bandwidth during a second period of time. In these cases, the storing unit 300 needs to be load-balanced between the processing unit 111 needs and those of the GPU. Hence, determining in off-line calculations the buffer management instructions would be much easier than doing it on-the-fly since bandwidth requirements for the image warping unit 110 could be average out over time.

Further in FIG. 2, based on the second information and for a current output line, the processing unit 111 is adapted to perform the operations of:

allocating fetched input lines into the line-buffer-based memory 112, and de-allocating input lines from the line-buffer-based memory 112 when not needed by the image warping unit 110.

Therefore, the second information could be seen by the processing unit 111 as a script giving instructions as to how the line-buffer-based memory 112 should be managed at given moment in time for a given output line to be outputted.

Referring back to FIG. 2, the line-based warping descriptor 302 may further comprise a third information describing an association of one output pixel of an output line with one or more input pixels of one or more input lines stored in the line-buffer-based memory 112. When an output pixel is associated with more than one input pixels, the line-based warping descriptor 302 may further comprise a fourth information describing an interpolation scheme to be used by the line-buffer-based memory 112 in order to generate the corresponding output pixel. For instance, bilinear interpolation or bicubic interpolation may be indicated in the fourth information. Obviously, the fourth information may be different for every output pixel associated with more than one input pixels. Also, the fourth information may be similar for groups of contiguous output pixels associated with more than one input pixels.

In example of embodiments wherein one output pixel of an output line is not associated with any input pixel of the stored input lines:

the line-based warping descriptor may further comprise a fifth information describing how the output pixel is to be displayed on the non-flat display unit 200; and, the image warping unit may be further adapted to generate the output pixel based on the fifth information.

Such situation may occur mainly for output pixels to be located at the edges of the non-flat display unit 200 wherein so much distortion may be experienced that no input pixels can be identified. In this case, no input pixels is retrieved from the line-buffer-based memory 112. However, the fifth information may instruct the processing unit 111 to generate an output pixel not based on any input pixel. For example, the fifth information may instruct the processing unit 111 to generate an output pixel with a special characteristics for it to appear as being invisible. For instance, such output pixels could be set to a black or white color depending on the environment and the type of non-flat display unit 200.

In another embodiment, the image warping unit 110 may be further adapted to, when outputting the current output line, fetch one or more lines input lines associated with the generation of at least one further output line yet to be outputted. As explained above with regards to FIG. 3A, the allocated input lines may be pre-fetched in advance, at certain moment in time in order to prevent any shortage of stored input lines required to generate an output line. For example, if at a given moment in time it is allowed to fetch five input lines but it is need only three input lines for the current output line, it may be more efficient to fetch four or five input lines at once in preparation for a further output line yet to be generated.

Figure 4:
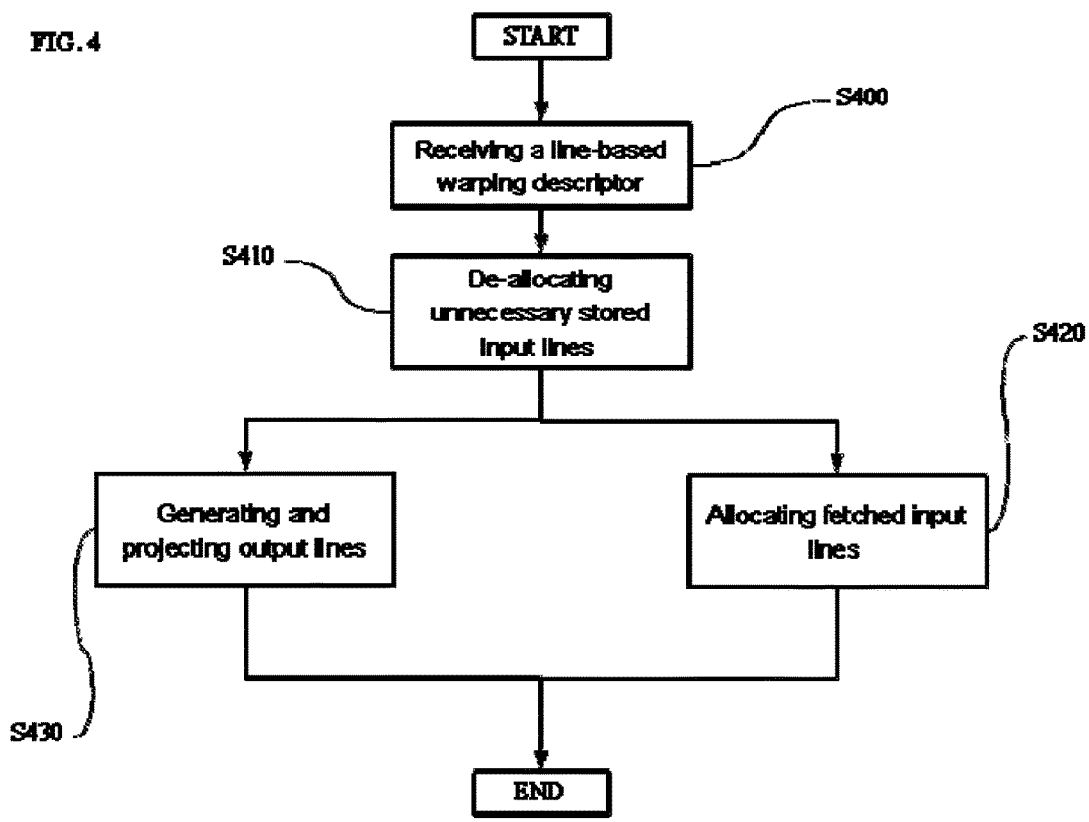
FIG. 4 is a schematic flow diagram of a method according to an embodiment of the subject application.

Referring now to FIG. 4, there is diagrammatically shown therein a flow diagram of a method according to an embodiment of the subject application and with regard to the HUD controller 110 of FIG. 2.

In S400, it is received at the image warping unit 110 a line-based warping descriptor 302 and a source image 301.

In S410, it is de-allocated unnecessary stored input lines from the line-buffer-based memory 112 based on the line-based warping descriptor 302. Namely, it is instructed here not to keep in the line-buffer-based memory 112 stored input lines that are not needed anymore to generate current and further output lines.

Then, S420 and S430 are preferably executed in parallel as already explained above.

In S420, it is allocated input lines fetched from the source image 302 into the line-buffer-based memory 112 based on the line-based warping descriptor 302. As already explained above, more input lines than required may be fetched at this moment in order to prevent any shortage of stored input lines for generating further output lines.

In S430, it is generated and projected output lines.

The skilled person would appreciate that the proposed solution implements a complete image warping unit 110 on-chip without the use of off-chip memories by solely using the line-buffer-based memory 112 of the image warping unit 110 which is configured to receive lines of pixels coming from the input image. This solution is achieved by the image warping unit 110 being driven by a script instructing the processing unit 111 to perform proper buffer management. Additionally, one should appreciate that the subject application takes advantage of external processing resources capabilities in order to determine buffer management instructions to be followed by the processing unit 111 of the image warping unit 110 thus avoiding the need to perform, on chip, on-the-fly resourceful calculations. The proposed solution may require less processing resources on-chip, thus reducing power consumption, saving access bandwidth memory and saving off-chip memories. It is also to be noted that the first, second, third, fourth and fifth information may be combined into one or more information inside the line-based warping descriptor 302. For example, the first, third and fourth information may be combined into a single information describing the distortion due to the non-flat display unit 200 and the association between output lines and input lines.

Of course, the above advantages are exemplary, and these or other advantages may be achieved by the proposed solution. Further, the skilled person will appreciate that not all advantages stated above are necessarily achieved by embodiments described herein.

The proposed solution may also be implemented in a computer program product stored in a non-transitory computer-readable storage medium that stores computer-executable code which causes a processor computer to perform the operation of the image warping module 110, for instance.

A computer program product is a list of instructions such as a particular application program and/or an operating system. The computer program may for example include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory unit storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as an operation to users and programs of the system.

The computer system may for example include at least one processing unit, associated memory unit and a number of input/output (I/O) devices. When executing the computer program, the computer system processes information according to the computer program and produces resultant output information via I/O devices.

In the foregoing specification, the proposed solution has been described with reference to specific examples of embodiments of the proposed solution. It will, however, be evident that various modifications and changes may be made therein without departing from the broader scope of the proposed solution as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality. For example, the user alert device and the driver alert may be combined in a single module. Also, one or more sensors may be combined in a single module.

Any arrangement of devices to achieve the same functionality is effectively "associated" such that the desired functionality is achieved. Hence, any two devices herein combined to achieve a particular functionality may be seen as "associated with" each other such that the desired functionality is achieved, irrespective of architectures or intermediate devices. Likewise, any two devices so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple examples of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the proposed solution is not limited to physical devices or units implemented in nonprogrammable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or operations then those listed in a claim. Furthermore, the terms "a" or "an," as used herein, are defined as one or as more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A script-driven head-up display, HUD, controller comprising:
    a memory, an image warping unit and an image projection unit;
    wherein:
    the image projection unit is adapted to project a source image onto a non-flat display unit;
    the image warping unit is adapted to generate a first output line of an output image and a second output line of the output image, the output image corresponding to the result of an electronic image warping of the source image;
    the image warping unit is operably coupled to the image projection unit and is further adapted to:
        receive, from the memory, a first line-based warping descriptor comprising a first information associated with a distortion of a test pattern image caused by the non-flat display unit while the test pattern image is projected by the image projection unit onto the non-flat display unit without prior application of an electronic image warping process to the test pattern image; and,
        in response to the reception of the first line-based warping descriptor, the image warping unit is further adapted to, based on the first line-based warping descriptor:
            extract first buffer management instructions from the first line-based warping descriptor;
            manage a line-buffer-based memory in accordance with the first buffer management instructions to fetch a first set of one or more lines of the source image, referred to as first input lines; and,
            output to the image projection unit the first output line of the output image, the first output line being associated with an electronic image warping of one or more pixels of the first input lines,
    and wherein:
    the image warping unit comprises a processing unit and the line-buffer-based memory, the line buffer-based memory being adapted to store the first input lines;
    the first line-based warping descriptor further comprises a second information including first buffer management instructions calculated off-line based on at least:

the first information mathematically describing the distortion due to the non-flat display unit; and,
a physical characteristic of the line-buffer-based memory;
the processing unit is adapted to perform the first buffer management instructions for the first output line, the operations of:
allocating fetched first input lines into the line-buffer-based memory; and,
de-allocating unneeded input lines from the line-buffer-based memory.

2. The HUD controller of claim 1, wherein the line-buffer-based memory is a dual port circular line-buffer-based memory comprising independent first input port and second output port, respectively adapted to simultaneously store input lines and output one or more pixels of one or more stored input lines.

3. The HUD controller of claim 1, wherein the line-buffer-based memory comprises at least one memory instance adapted to store input lines or output one or more pixels of one or more stored input lines according to a time-multiplexed scheme.

4. The HUD controller of claim 1, wherein the line-buffer-based memory is physically limited in terms of the maximum number of fetched input lines to be stored at once versus the image warping unit outputting one output line.

5. The HUD controller of claim 1, wherein the first line-based warping descriptor further comprises:
a third information describing an association of one output pixel of the first output line with one or more input pixels of the first input lines; and,
a fourth information describing an interpolation scheme to be used by the line-buffer-based memory to generate the output pixel associated with more than one input pixels.

6. The HUD controller of claim 5 wherein when a particular output pixel of the first output line is not associated with any input pixel of the first input lines:
the line-based warping descriptor further comprises a fifth information describing how the particular output pixel is to be displayed on the non-flat display unit; and,
the image warping unit is further adapted to generate the particular output pixel based on the fifth information.

7. The HUD controller of claim 1, wherein the image warping unit is further adapted to, when outputting the first output line, fetch one or more input lines associated with the generation of the second output line.

8. The HUD controller of claim 1, wherein the HUD controller is coupled to:
a storing unit adapted to store at least one source image and a line-based warping descriptor; and
a non-flat display unit adapted to display an output image projected and generated by the HUD controller based on at least the source image and the line-based warping descriptor.

9. The HUD controller of claim 8, wherein the HUD controller is implemented in a vehicle.

10. The HUD controller of claim 8, wherein the HUD controller is implemented in an apparatus.

11. A method of operating a script-driven head-up display, HUD, controller, the HUD controller comprising a memory, an image warping unit and an image projection unit operably coupled together, wherein the image projection unit is adapted to project a source image onto a non-flat display unit and the image warping unit is adapted to generate at least a first line of an output image and a second line of the output image, the output image corresponding to the result of an electronic image warping of the source image, the method comprising:
receiving, from the memory, a first line-based warping descriptor comprising a first information associated with a distortion of a test pattern image caused by the non-flat display unit while the test pattern image is projected by the image projection unit onto the non-flat display unit without prior application of an electronic image warping process to the test pattern image;
in response to the reception of the first line-based warping descriptor and based on the first line-based warping descriptor:
extracting first buffer management instructions from the first line-based warping descriptor;
managing a line-based memory in accordance with the first buffer management instructions to fetch a first set of one or more lines of the source image, referred to as first input lines; and,
outputting to the image projection unit the first output line of the output image, the first output line being associated with an electronic image warping of one or more pixels of the first input lines,
wherein:
the image warping unit comprises a processing unit and the line-buffer-based memory, the line buffer-based memory being adapted to store the first input lines;
the first line-based warping descriptor is calculated off-line based on at least:
one physical characteristics of the line-buffer-based memory; and,
the first information mathematically describing the distortion due to the non-flat display unit;
the first line-based warping descriptor further comprises a second information including the first buffer management instructions;
the method further comprising, performing the first buffer management instructions for the first output line:
allocating fetched first input lines into the line-buffer-based memory; and,
de-allocating unneeded input lines from the line-buffer-based memory.

12. The method of claim 11, wherein the first line-based warping descriptor further comprises:
a third information describing an association of one output pixel of the first output line with one or more input pixels of the first input lines; and,
a fourth information describing an interpolation scheme to be used by the line-buffer-based memory to generate the one output pixel associated with the one or more input pixels.

13. The method of claim 12 wherein when a particular output pixel of the first output line is not associated with any input pixel of the first input lines:
the first line-based warping descriptor further comprises a fifth information describing how the particular output pixel is to be displayed on the non-flat display unit; and,
the image warping unit is further adapted to generate the particular output pixel based on the fifth information.

14. The method of claim 11, wherein the image warping unit is further adapted to, when outputting the first output line, fetch one or more input lines associated with the generation of the second output line.

15. The script-driven head-up display of claim 1, the image warping unit further adapted to:
receive, from the memory, a second line-based warping descriptor comprising a third information associated with a distortion of a test pattern image caused by the non-flat display unit while the test pattern image is projected by the image projection unit onto the non-flat display unit without prior application of an electronic image warping process to the test pattern image; and, in response to the reception of the second line-based warping descriptor, the image warping unit is further adapted to, based on the second line-based warping descriptor:

extract second buffer management instructions from the second line-based warping descriptor;

manage the line-buffer-based memory in accordance with second buffer management instructions in order to fetch a second set of one or more lines of the source image, referred to as second input lines; and, output to the image projection unit the at least one output line of the output image, the at least one output line being associated with an electronic image warping of one or more pixels of the second input lines, and wherein:

the line buffer-based memory is further adapted to store the second input lines; and the second line-based warping descriptor further comprises a fourth information including second buffer management instructions.

16. The method of claim 11, further comprising:

receiving, from the memory, a second line-based warping descriptor comprising a third information associated with a distortion of a test pattern image caused by the non-flat display unit while the test pattern image is projected by the image projection unit onto the non-flat display unit without prior application of an electronic image warping process to the test pattern image;

in response to the reception of the second line-based warping descriptor and based on the second line-based warping descriptor:

extracting second buffer management instructions from the second line-based warping descriptor;

managing the line-based memory in accordance with the second buffer management instructions to fetch a second set of one or more lines of the source image, referred to as second input lines; and, outputting to the image projection unit the second output line of the output image, the second output line being associated with an electronic image warping of one or more pixels of the second input lines.

17. The script-driven head-up display of claim 1, wherein:

the second information is structured as a script of buffer management instructions; and the script is performed by the processing unit.

* * * * *